US 6,540,059 B2

(12) United States Patent
Drexl (10) Patent No.: US 6,540,059 B2
(45) Date of Patent: Apr. 1, 2003

(54) ACTUATION DEVICE FOR A FRICTION CLUTCH IN A MOTOR VEHICLE

(75) Inventor: Hans-Jürgen Drexl, Schonungen (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/834,057

(22) Filed: Apr. 12, 2001

(65) Prior Publication Data

US 2001/0030098 A1 Oct. 18, 2001

(30) Foreign Application Priority Data

Apr. 14, 2000 (DE) .......................................... 100 18 630

(51) Int. Cl.⁷ .............................................. F16D 25/08
(52) U.S. Cl. .................. 192/86; 192/85 CA; 192/91 A; 192/30 W; 192/109 F; 192/98
(58) Field of Search ......................... 192/85 CA, 91 A, 192/30 W, 109 F, 98, 86, 89.23, 89.24

(56) References Cited

U.S. PATENT DOCUMENTS

| | | | | |
|---|---|---|---|---|
| 2,864,480 A | * | 12/1958 | Sink ....................... | 192/85 CA |
| 2,873,834 A | * | 2/1959 | Kepner ................... | 192/85 CA |
| 4,646,893 A | * | 3/1987 | Romi ...................... | 192/85 CA |
| 4,702,361 A | * | 10/1987 | Banks ..................... | 192/111 A |
| 6,029,789 A | * | 2/2000 | Lindner et al. .......... | 192/111 A |
| 6,029,792 A | * | 2/2000 | Beitler et al. ........... | 192/111 A |

FOREIGN PATENT DOCUMENTS

DE 197 16 600 12/1997

* cited by examiner

*Primary Examiner*—Saul Rodriquez
(74) *Attorney, Agent, or Firm*—Cohen, Pontani, Lieberman & Pavane (57) ABSTRACT

An actuation device for a friction clutch which is arranged in the drivetrain of a motor vehicle between a drive unit and a transmission arrangement includes a pressure medium force cylinder arrangement for actuating the friction clutch via a release member having a release bearing arrangement. A measuring arrangement detects an actual release state, i.e., an instantaneous position of the release member. A control/regulating valve arrangement is connected with a pressure medium source, a pressure compensation opening, and with the pressure medium force cylinder arrangement. The pressure medium force cylinder arrangement is actuated depending on the actual release state and on a desired release state. The actuation device is adjustable in a defined manner between a non-actuation state and an actuation state, wherein the release bearing arrangement is decoupled from an associated release force receiving arrangement of the friction clutch in the non-actuation state and is coupled with the release force receiving arrangement in the actuation state.

9 Claims, 3 Drawing Sheets

ACTUATION DEVICE FOR A FRICTION CLUTCH IN A MOTOR VEHICLE

BACKGROUND OF THE INVENTION

1. Field of the Invention

The present invention relates to an actuation device for a friction clutch arranged in the drivetrain of a motor vehicle between a drive unit and a transmission arrangement, the actuation device having a pressure medium force cylinder arrangement for actuating the friction clutch via a release member having a release bearing arrangement, a measuring arrangement for detecting an actual release and/or instantaneous release member position, and a control/regulating valve arrangement connected with a pressure medium source, a pressure compensation opening or a pressure compensation reservoir and the pressure medium force cylinder arrangement, the control/regulating valve arrangement arranged for actuating the pressure medium force cylinder arrangement in response to the actual release or the instantaneous release member position and on a reference release which may be predetermined.

2. Description of the Related Art

An actuation device for a friction clutch including a pressure medium force cylinder arrangement for actuating the friction clutch via a release member having a release bearing arrangement and a control/regulating valve arrangement arranged for actuating the pressure medium force cylinder arrangement is known, for example, from German reference DE 197 16 600 A1, whose disclosure is incorporated in the disclosure of the present application by reference.

With regard to the service life of drivetrains, especially in utility motor vehicles, the release bearing arrangement of the actuation device for actuating the clutch is increasingly regarded as the weakest link in the drivetrain. The life of the drivetrain is an important competitive feature for automobile manufacturers and their suppliers. It would be ideal if all components would last as long as the engine, for example, 800,000 to 1 million kilometers based on conditions prevailing in Europe. With respect to conditions in the USA, a life of more than 1 million kilometers may even be assumed.

With respect to labor costs and immobilization periods of the vehicles, the mileage up to the first engine/transmission disassembly plays an important role. Until recently, clutch facings typically had to be replaced at least once during the life of the engine because of comparatively high facing wear. When the clutch facings were replaced, the relatively inexpensive release bearing was also changed as a precaution, so that it was not until recently that any attention was paid to release bearings and the release bearings were generally constructed without sealing in spite of unfavorable operating conditions (for example, temperature and dust) and release bearings generally did not require premature repair or maintenance steps. As was also the case previously, this situation still applies to distribution vehicles and construction site vehicles in which interim replacement of facings and advisably also of release bearings is still required and practiced today. However, in long-distance transport vehicles, the clutches including the clutch facings are increasingly able to last just as long as the engine. Accordingly, the life of the release bearing is now a factor. To increase the life of the release bearing, its sealing was improved and openings provided in the clutch covers were closed insofar as practicable. However, these solutions still did not produce adequate results.

SUMMARY OF THE INVENTION

The object of the present invention is to improve the life of the release bearing for friction clutches. To meet this object, the actuation device is adjustable or displaceable in a defined manner between a non-actuation state and an actuation state according to the present invention, wherein the release bearing arrangement is decoupled from an associated release force receiving arrangement of the friction clutch in the non-actuation state and is coupled with the release force receiving arrangement in the actuation state. The release force receiving arrangement may comprise an engagement spring arrangement.

The present invention is based on the idea and insight that the friction clutches in vehicles used in long-distance transport only run about 100 to 200 hours total operating time in the fully or partially released state. It is only during this time that the release bearing transmits the release force used for clutch actuation. During the rest of the operating time, the release bearing generally rotates at the rotational speed of the crankshaft with a preloading of approximately 2 to 3% of the maximum release force.

Assuming an engine life of about 15,000 hours in engines with more than 10 liters piston capacity (in long-distance transport, this life corresponds approximately to a traveled distance of 900,000 km assuming an average speed of 60 km, while the distance is correspondingly shorter in distribution and construction site transport because of the lower average speed), the total releasing time is about 1% of the operating period. Accordingly, the release bearing idles for 99% of the operating period and transmits engine vibrations to the release system. In Class 8 vehicles in the USA, there is an even greater incongruity between clutch transmission and idle time of the release bearing because shifting occurs without clutch actuation in this class of vehicle. The clutch is needed only for startup and shifting. Therefore, a total force transmission duration of about only 50 hours may be assumed for the Class 8 vehicles.

In this connection, the construction of the actuation device according to the present invention makes an extraordinary increase in the life of the release bearing arrangement possible. For operating periods in which the clutch is not to be actuated or in which there is no pending clutch actuation, the actuation device may be adjusted to the non-actuation state in which the release bearing arrangement is decoupled from the release force receiving arrangement with a corresponding gentler treatment of the release bearing arrangement. The actuation device only needs to be moved into the actuation state for clutch actuation and possibly for expected clutch actuation to couple the release bearing arrangement with the release force receiving arrangement. In short, the construction of the actuation device according to the invention allows the release bearing arrangement to run only when it is actually used or when clutch actuation is imminent. Consequently, the release bearing arrangement is exposed to less wear and is therefore more reliable and has a longer life.

Furthermore, the increased reliability and life of the release bearing arrangement which is achieved according to the present invention allows less complicated and therefore economical release bearing components to be used.

In addition to the advantage of increased life and the resulting increased dependability of the release bearing arrangement, the direct transmission of engine vibrations to the release system is eliminated or at least greatly reduced by adjusting the actuation device to the non-actuation state. The pressure medium force cylinder arrangement may, for example, include a pneumatic force cylinder arrangement or a pneumatic ring cylinder. Micromovements of the pressure medium force cylinder induced by engine vibrations contribute to wear of the seals acting between the pressure medium piston and cylinder. Accordingly, an increased life of the seals and accordingly a prolonging of the maintenance-free operating period of the pressure medium force cylinder arrangement is achieved by reducing or eliminating micromovements of the pressure medium force cylinder arrangement deriving from microvibrations.

However, providing a non-actuation state to which the actuation device may be adjusted requires changing the typical actuation device which may forfeit some advantages of the known actuation device. For example, the adjustment of the actuation device from the non-actuation state to the actuation state requires a certain time. Accordingly, a construction of the actuation device according to the present invention introduces a time constant which limits the reaction or response time of the actuation device, at least when no special additional steps are taken to at least make up for this time constant. When the non-actuation state is realized through the introduction of play or dead travel, the release path portion of the total clutch pedal travel is reduced by the amount of play or dead travel when the non-actuation state is introduced which increases the level of force required for release. For this reason, known hydraulic clutch actuation devices are constructed with no play in the clutch actuation system. Moreover, known clutch pedals actuating a hydraulic master cylinder always occupy a position independent from facing wear because of wear compensation that is achieved via a blow bore hole in the master cylinder. Furthermore, doing away with an idle path caused by play in the known clutch actuation devices results in a favorable pedal characteristic at a low level of pedal force.

According to a further embodiment of the present invention, the actuation device may be adjusted to an actuation-ready state in which the release bearing arrangement is coupled with the release force receiving arrangement in the engaged position of the clutch or is proximate the release force receiving arrangement in the engaged position of the clutch so that the release bearing arrangement may be coupled with the release force receiving arrangement with a slight adjustment. According to this further embodiment, the actuation device may be adjusted to the actuation-ready state when a clutch actuation is pending or at least prognosticated. The time constant ascribed to the actuation device for clutch actuation proceeding from the actuation-ready state is substantially smaller than the time constant attributed to a clutch actuation proceeding from the non-actuation state. In this further development, short response times are achieved as is required, for example, for split shifting operations in split-range transmissions.

The actuation state, the non-actuation state and the optional actuation-ready state may be defined in different ways. For example, the actuation state may be defined as when the release bearing arrangement in the actuation state transmits a release force between the release member (such as a release piston of the pressure medium force cylinder arrangement) and the release force receiving arrangement. The non-actuation state may be defined as when the release bearing arrangement in the non-actuation state does not transmit any substantial releasing force or preloading force between the release member and the release force receiving arrangement. The actuation-ready state may be defined as when the release bearing arrangement in the actuation-ready state is coupled with the release force receiving arrangement and a preloading force is transmitted between the release member and the release force receiving arrangement.

The release bearing arrangement may comprise a first bearing part which is rotatable along with the clutch and a second bearing part arranged at the release member so as to be fixed with respect to rotation relative to the release member. In this embodiment of the release bearing arrangement, the actuation state may be defined as when a rotational driving connection is produced between the clutch and the first bearing part via the release force receiving arrangement and the non-actuation state may be defined as when this rotational driving connection is interrupted. The actuation-ready state may be defined as when the release bearing arrangement is coupled with the release force receiving arrangement and the rotational driving connection is produced between the clutch and the first bearing part by the release force receiving arrangement.

The non-actuation state may be realized in a simple manner by introducing an idle path in the release system such that the release bearing arrangement occupies a standby or waiting position in the non-actuation state which is displaced by the idle path relative to an operating position corresponding to a completely engaged state of the friction clutch. In this case, the release bearing arrangement in the actuation-ready state, insofar as it is provided, may occupy a ready position which substantially corresponds to the completely engaged state of the friction clutch.

An adjusting spring arrangement which biases in the direction of the waiting position may be provided. The release bearing arrangement may be moved into the waiting position by this adjusting spring arrangement. An adjusting spring arrangement of this kind is particularly relevant when the pressure medium force cylinder arrangement comprises a single-action arrangement in which, because of the idle path, the release force receiving arrangement (which may, for example, be an engaging spring arrangement such as diaphragm spring arrangement) is not available to move the release bearing arrangement into the waiting position.

However, the release bearing arrangement may be moved into the waiting position via the pressure medium force cylinder arrangement if the pressure medium force cylinder comprises a double-acting arrangement.

A mechanical stop may be used to define the waiting position. The mechanical stop generally defines a wear-independent waiting position, so that the idle path changes in response to clutch wear insofar as appropriate steps for wear compensation are not taken.

The waiting position may vary according to the state of wear of the friction clutch to provide a constant idle path. For example, it may be desirous to provide a very short idle path (a small defined play) independent from the instantaneous wear state to ensure short, wear-independent actuation times. The waiting position may be adjusted and maintained, for example, completely independent from a mechanical stop via the pressure medium force cylinder arrangement by regulating/controlling the position by pressure medium (for example, pneumatic position regulation/control or hydraulic position regulation/control). In this embodiment, the force of an optional adjusting spring or restoring spring arrangement may be held in equilibrium by the pressure medium pressure.

With regard to holding the release bearing arrangement in the waiting position in the non-actuation state, the release bearing arrangement may be held in the waiting position in the non-actuation state by the pressure medium force cylinder arrangement and/or by the adjusting spring arrangement and/or by friction forces.

The actuation device further includes a control/regulating unit which adjusts the actuation device, as required, between the non-actuation state and the actuation state or between the non-actuation state, the actuation-ready state and the actuation state. In response to the actual release state which is determined relative to the instantaneous release member position and a desired release state, the control/regulating unit actuates the pressure medium force cylinder arrangement in the actuation state via the control/regulating valve arrangement to actuate the clutch. The desired release state may be a default valve or a value based on empinical data. In this way, the actuation device may acheive very short effective actuation times which even satisfy the very high requirements of split shifting in this respect. Accordingly, an adjusting strategy realized by the control/regulating unit may be provided in that the actuation device is adjusted to the actuation-ready state and is left in this state so that the release bearing arrangement continuously runs along with the friction clutch in the lower gears of the transmission arrangement in which the shifting processes generally succeed one another quickly. The actuation device may be adjusted to the non-actuation state in the upper gears so that the release bearing arrangement does not run along with the friction clutch and is consequently treated with care. The adjustment of the actuation device between the different states by the control/regulating device may be performed in response to information which, for example, is supplied by a driving speed signal and/or a shift group signal of the transmission arrangement to the control/regulating unit.

The control/regulating unit acts on or influences the actuation device i.e., the state occupied by the actuation device, via the control/regulating valve arrangement and the pressure medium force cylinder arrangement. In this respect, it is noted particularly that the control/regulating unit actuates the pressure medium force cylinder arrangement via the control/regulating valve arrangement for adjusting the actuation device from the non-actuation state into the actuation-ready state or from the non-actuation state through the actuation-ready state to the actuation state or from the non-actuation state into a boundary state belonging to the actuation state of beginning clutch actuation or from the non-actuation state through the boundary state into the actuation state.

The boundary state is the state between the non-actuation state and the actuation state. In the boundary state, the release bearing arrangement may momentarily occupy a boundary position which essentially corresponds to the fully engaged state of the friction clutch. In a corresponding manner, the release bearing arrangement in the actuation-ready state may—as was already mentioned—occupy a ready position which essentially corresponds to the fully engaged state of the friction clutch.

In general, the adjustment of the actuation device between the states (actuation state, non-actuation state and possibly actuation-ready state) and the clutch actuation itself may be based on boundary position information and ready position information which is either predetermined or detected. The detection of the position information may include using the control/regulating unit to determine the ready position and boundary position based on measurements taken by the measuring arrangement and storing the measurements for use in further operation.

The control/regulating unit may determine the ready position and the boundary position from a change in an adjusting speed of the release member which occurs when moving through the ready position or boundary position. This determination is preferably made during an adjustment of the actuation device between the non-actuation state, the actuation-ready state or boundary state, and the actuation state. Accordingly, the control/regulating unit may identify the ready position or boundary position as a position of the release member, i.e., the release bearing arrangement, in which the adjusting movement of the release member is braked in a defined manner by the engagement spring arrangement in the course of a disengagement by the adjustment of the actuation device from the non-actuation state to the actuation state.

The control/regulating unit may also identify the ready position or boundary position as a position of the release member which corresponds to a relaxed engagement spring arrangement and the position to which the engagement spring arrangement adjusts the release member, including the release bearing arrangement, in the course of a complete engagement. For example, the conclusion of the engagement process, namely, the relaxation of the release spring arrangement (possibly the diaphragm spring arrangement) may be utilized in that the measuring arrangement detects the position in which the release bearing arrangement or the clutch release (possibly actuation piston) is adjusted by the release spring arrangement.

The control/regulating unit may optionally comprise a prognostic unit which forecasts the frequency and/or probability of future clutch actuations (clutch release processes) in a preview time interval based on operating and/or driving states of the vehicle, operating and/or actuation states of the transmission, operating states of the drive unit, and/or actions of a driver. The control/regulating unit optionally adjusts the actuation device between the non-actuation state and the actuation-ready state depending on the prognosis. The prognostic unit forecasts the frequency and/or probability of future clutch actuations in a preview time interval and accordingly allows the adjustment of the actuation device in response to (1) the instantaneous requirements for switching between the above-mentioned states and (2) the future needs to switch between the states. As was already indicated above, a reduction in the effective time constant of the actuation device with respect to carrying out clutch actuations may be achieved in this way. Moreover, this embodiment avoids the need to constantly adjust the actuation device between the above-mentioned states successively in short time intervals with resulting frequent acceleration of the release bearing arrangement from a standstill, at least under normal driving and operating conditions forming the basis of the prognosis. With respect to acceleration processes, wear on the release bearing deriving from acceleration of the release bearing from a standstill to clutch speed and/or noises deriving from these acceleration processes is appreciably reduced by use of the prognostic unit.

As was already mentioned, the pressure medium force cylinder arrangement may comprise a pneumatic force cylinder arrangement. Further, the control/regulating valve arrangement may comprise an electrically controlled valve arrangement.

The present invention is directed to a motor vehicle drivetrain, particularly a drivetrain in a utility vehicle, comprising a drive unit, i.e., an internal combustion engine, a transmission arrangement and a friction clutch arranged between the drive unit and the transmission arrangement, and comprising an actuation device according to the present invention. The transmission arrangement may be a transmission arrangement of the type which can be shifted regularly without clutch actuation such as, for example, class 8 vehicles in the USA, ASG design, or the Opticruise type. However, the transmission arrangement may also be the type that can be shifted regularly at least between determined gear multiplications only by clutch actuation such as, for example, a split-range transmission for which short clutch actuation times are generally required.

The invention is described more fully in the following with reference to embodiment examples shown in the Figures, wherein identical reference numbers are used for analogous or corresponding or identical structural component parts and functional elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
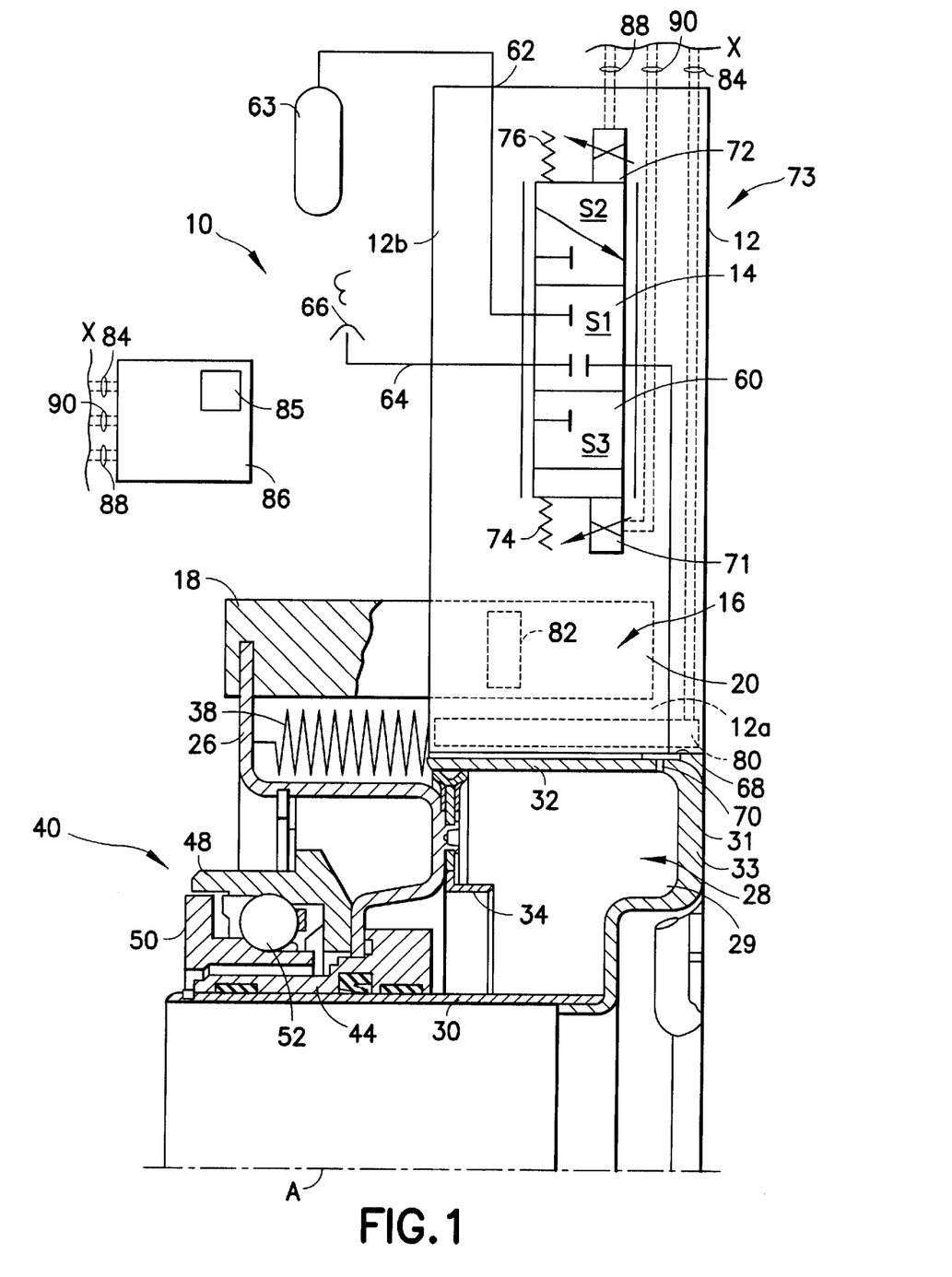
FIG. 1 is a partial longitudinal sectional schematic view of an actuation device for a motor vehicle friction clutch with a pressure medium force cylinder in the moved out state.

FIG. 1 shows an actuation device 10 (which may also be referred to as a release arrangement 10) according to an embodiment of the present invention. The actuation device 10 is used, for example, in commercial or utility vehicles and is constructed such that it surrounds an axis of rotation A of a motor vehicle friction clutch, not shown in FIG. 1, essentially concentrically. Various components of the actuation device 10 are constructed in a ring-shaped manner and surround the axis of rotation A.

The actuation device 10 includes an actuation unit 13 with a housing 12. A valve arrangement 14, described in further detail below, is integrated in the housing 12 and is shown on the radial outer side 12b thereof. A measuring arrangement 16 is arranged on the radial inner side 12a of the housing 12 and includes a measuring member 18 displaceable along the axis of rotation A. The measuring member 18 is displaceable in a chamber 20 constructed in the housing 12 and open on one axial side.

An end of the measuring member 18 projecting from the chamber 20 is in a displacement engagement with an annularly constructed pressure medium force piston, i.e., a release piston 26. The release piston 26 is part of a pressure medium force cylinder arrangement, i.e., a release cylinder arrangement 28. In the present case, the release cylinder arrangement 28 is a pneumatic force cylinder arrangement. The release piston 26 is constructed as a ring piston and is displaceable in the direction of the axis of rotation A. A ring cylinder space 29 is defined by a pipe part 30 and an annular wall part 31 having a radial outer wall part 32 and a bottom portion 33. A piston element 34 of the release piston 26 engages in the ring cylinder space 29. Different sealing elements which seal the ring cylinder space 29 so as to be tight against pressure medium, particularly pneumatically tight, act between the release piston 26, particularly its piston element 34, and the pipe part 30 and the wall part 31.

The release piston 26 may be biased by a corresponding pretensioning or biasing compression spring received in the ring cylinder space 29 toward abutment with a release bearing 40 fixedly coupled with the release piston 26 at an associated engagement spring arrangement 111 (see FIG. 2) such as a diaphragm spring arrangement or plate spring arrangement of the friction clutch. In the embodiment of FIG. 1, in contrast to this biasing of the release piston 26 in the direction of the engagement spring arrangement which is usually provided, a biasing of the release piston 26 in the opposite direction is provided by a biasing tension spring arrangement 38 which includes a plurality of biasing tension springs which are preferably arranged at regular intervals around the circumference of the release piston 26 and which are clamped in between the release piston 26 and fastening portions at the annular wall portion 31 (see FIG. 3). The action of the biasing tension spring arrangement 38 pulls the release piston 26 and, therefore, the release bearing 40 away from the engagement spring arrangement 111 insofar as this is permitted by the release cylinder arrangement.

The release bearing 40 comprises two bearing shells 48, 50, known per se, and bearing balls 52 being arranged therebetween. The bearing shell 48 is coupled with a displacing part 44 of the release piston 26 and the bearing shell 50 is rotatable about the axis of rotation A with respect to these structural component parts and cooperates with spring tabs, or the like, of the engagement spring arrangement 111 for releasing the clutch.

It is noted that the actuation device in the embodiment of FIG. 1 is designed to work together with a pushed clutch, but conversion would be possible for working with a pulled clutch without extensive structural modifications.

The valve arrangement 14 is formed by a 3/3-way proportional solenoid valve 60. A pneumatic source 63 is connected to the valve 60 via a connection 62 of the housing 12. Further, a pressure compensation opening 66 is connected to the valve 60 via a connection 64 of the housing 12. Finally, the valve 60 is connected to the ring cylinder space 29 of the release cylinder 28 via a connection 68 of the housing and a connection 70 of the actuation cylinder 28. The valve 60 may be adjusted via electrically controllable proportional magnets 71 and 72 from a holding position S1, which is occupied by the valve without excitation of the proportional magnets due to a corresponding spring biasing (springs 74, 76) arranged on the valve 60, into a compressed air feed position S2 in which a compressed air feed connection is produced between the pneumatic source 63 and the ring cylinder space 29 by the valve 60 and, alternatively, into a venting position S3 in which a venting connection is produced between the ring cylinder pace 29 and the pressure compensation opening 66 by the valve 60. Alternatively, the valve 60 may also be designed and connected such that the valve occupies the venting position S3 without excitation of magnets 71 and 72 due to the biasing of the spring arrangements 74, 76. The corresponding design and connection of a valve 60 is a matter of preference for the person skilled in the art and is not relevant to the discussion of the present invention. The type of valve or the number of valves provided is also not significant in this connection; for example, several switching valves may be provided instead of the proportional valve 60.

In the embodiment shown in FIG. 1, the measuring arrangement 16 works magnetically. The measuring arrangement 16 has a coil body 80 which works together with a magnet element 82 fixed to the inner end of the measuring member 18 and supplies an electric signal representing the axial position of the magnet element 82 to a control/regulating unit 86 via electric lines 84. Since the measuring member 18 is movement-coupled with the release piston 26 and is displaced with the release piston 26 in the direction of axis A, the signal transmitted to the control/regulating unit 86 on the lines 84 represents the actual release state of the release piston 26. When an engagement between the engagement spring arrangement and the release bearing 40 exists, the signal transmitted to the control/regulating unit 86 represents the actual release state of the friction clutch. Alternatively, a sensor other than a magnetic sensor 80, 82 such as, for example, a linear potentiometer may also be provided.

The control/regulating unit 86 actuates the valve 60 in response to a command variable indicating a desired release state and in response to the actual release state of the release piston 26 detected by the measuring arrangement 16 and adjusts the actuation device such that the actual release state of the release piston 26 approximates the desired release state and, ideally, the actual release state corresponds to the desired release state. The actuation of the valve 60 by the control/regulating unit 86 may also depend on a boundary position of the release bearing or of the release piston 26. The boundary position corresponds to the fully engaged state of the friction clutch with contact of the release bearing 40 at the relaxed engagement spring arrangement. The boundary position may be defined at a specific location or may be determined via measuring arrangement 16 and stored in a memory 85 of the control/regulating unit 86. To actuate the valve 60, the control/regulating unit 86 excites the proportional magnet 71 and/or proportional magnet 72, as required, via electric lines 88, 90 to selectively adjust the valve 60 to the holding position S1, the compressed air feed position S2, and the venting position S3. The control/regulating unit 86 adjusts an effective flow cross section of the valve 60 by different degrees of excitation of the magnet 71 and magnet 72 in the compressed air feed position S2 and the venting position S3 to adjust the compressed air feed flow and compressed air venting flow which contribute to determining the releasing and engaging speed.

An electrical interface between the valve 60 and the control/regulating unit 86 is represented in FIG. 1 by a cross X. The interface X may be formed by a plug connector arrangement, generally an electric connector, for example, a plug connector strip at the housing 12 or a plug connector at a free end of a multiwire cable or cable tree that is fixed with respect to the housing. The connections 62 and 64 for the pneumatic source 63 and the pressure compensation opening 66 may comprise detachable connections such as, for example, connection nipples which are fixed with respect to the housing 12.

The command variable on the basis of which the control/regulating unit 86 actuates the valve 60 and accordingly the release cylinder 28 and consequently the friction clutch may be predetermined by vehicle electronics. However, the command variable may also be derived from the actuation of a clutch pedal 100 and an electric signal transmitter 102 (for example, a potentiometer) associated with the latter (see FIG. 2).

Figure 2:
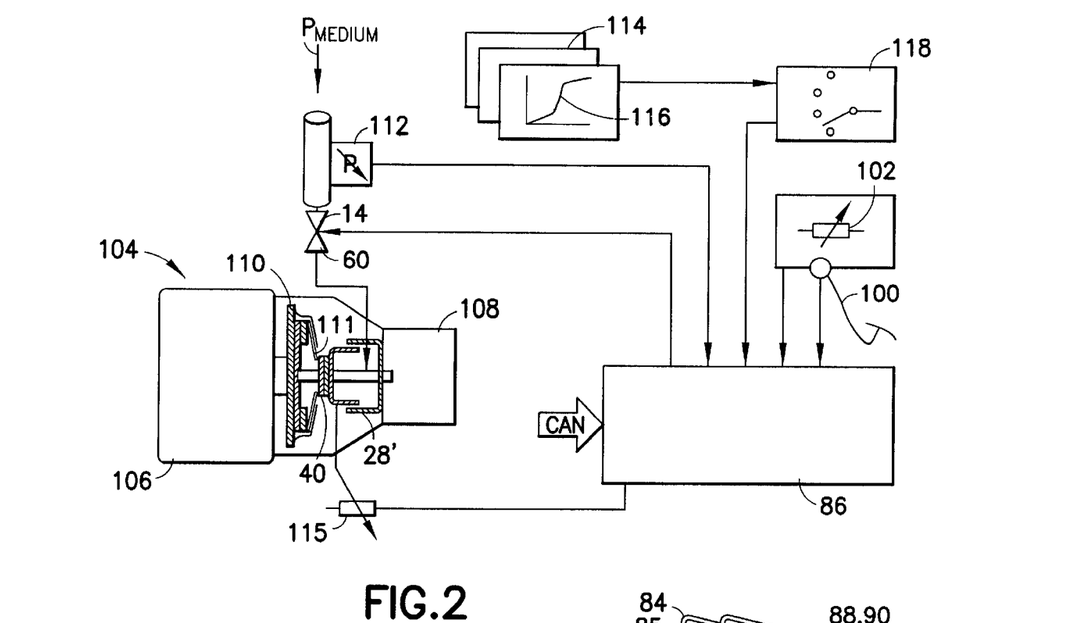
FIG. 2 is a schematic view of a drivetrain of a motor vehicle including an engine, a transmission, a friction clutch and an actuation device for the friction clutch according to an embodiment of the present invention.

FIG. 2 is a schematic diagram showing a drivetrain 104 with an engine 106, a transmission 108 and a friction clutch 110 which can be actuated by a release cylinder 28' acting on an engagement spring arrangement 111 of the friction clutch via the release bearing 40. The release cylinder 28' is a double-acting cylinder which will be described in more detail below. A potentiometer 115 is indicated schematically in FIG. 2 as the sensor detecting the actual release. According to FIG. 2, the control/regulating unit 86 also receives an electric signal from a pressure gauge 112 which measures the pressure of the compressed air delivered by the pneumatic source 63, not shown in FIG. 2.

A characteristic field 114 is assigned to the control/regulating unit 86. The characteristic field 114 has a plurality of characteristic lines 116 which convert the command variable given by the clutch pedal 100 into a reference release on the basis of which (and also on the basis of the actual release state detected by the measuring arrangement 16), the control/regulating unit 86 controls the valve 60.

When there are a plurality of characteristic lines, a characteristic line switch 118 may be used to select from the different characteristic lines 116 of the characteristic field 114 a characteristic line upon which to base the conversion of the command variable to the reference release. For example, a number of different characteristic lines tailored specifically to determined driving situations, for example, a startup and shifting characteristic line and a normal driving line, may be provided.

Figure 3:
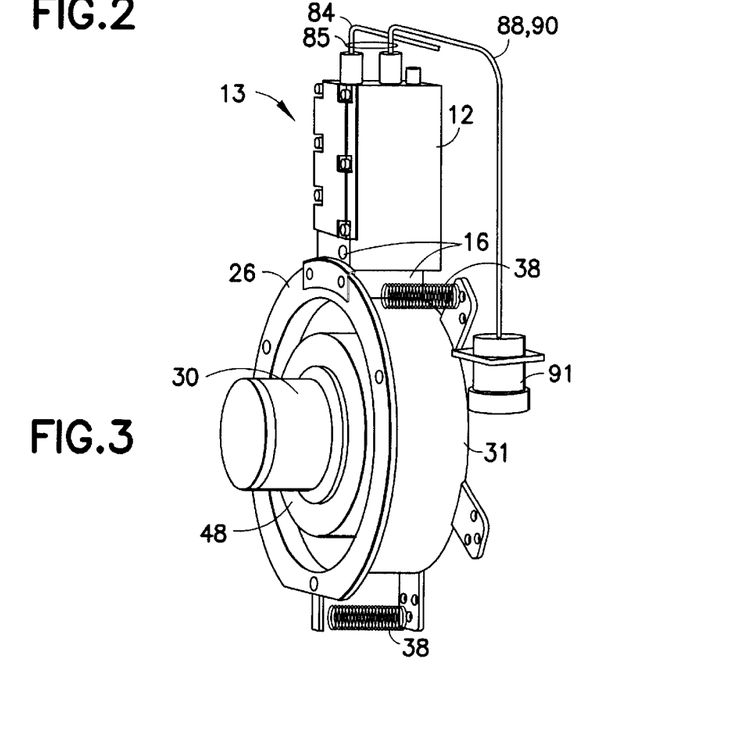
FIG. 3 is a perspective view of an actuation device for a motor vehicle friction clutch of FIG. 1.

FIG. 3 is a perspective view of a release or actuation cylinder 28 with actuation unit 13 mounted thereon (comprising a housing 12, a control/regulating valve arrangement integrated therein and a measuring arrangement 16 which can also be referred to as a path measuring device). The drawing shows power and control lines 85 by which the path measuring device and the control/regulating valve arrangement are connected to an associated control/regulating unit, specifically by electric plug-in connectors 91. The biasing tension springs of the biasing tension spring arrangement 38 engage with the release piston 26 and with tab-shaped fastening portions at the cylinder housing 31.

Figure 5:
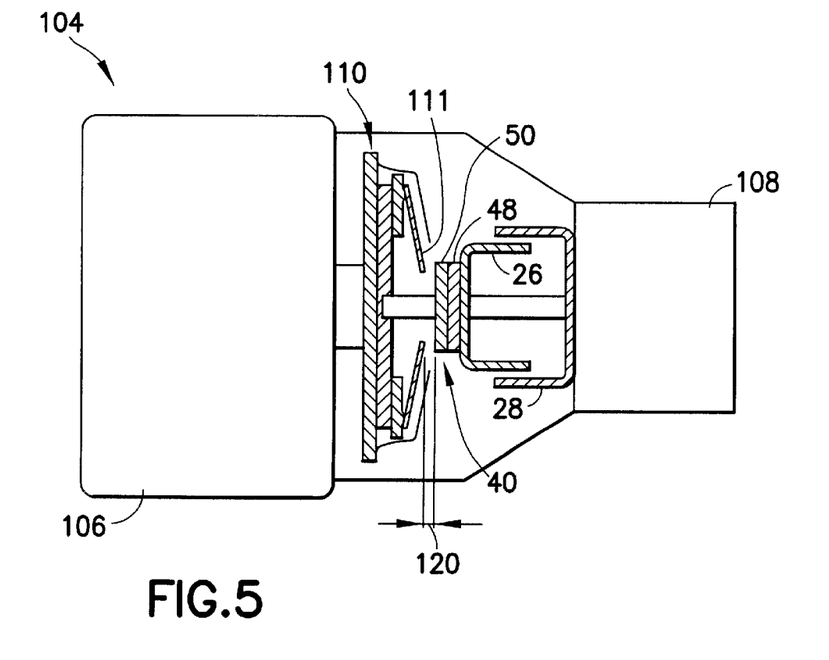
FIG. 5 is a schematic sectional view of the drivetrain of FIG. 2 with the actuation device adjusted in a non-actuation state, wherein in the non-actuation state the release bearing occupies a waiting position which is displaced by an idle path relative to the ready position or boundary position.

To spare the release bearing 40 and therefore to prolong the life of the release bearing 40, the actuation device 10 may be adjusted to a non-actuation state represented in FIG. 5 in which the release bearing 40 is out of engagment with the engagement spring arrangement 111, that is, the release bearing 40 is decoupled from the engagement spring arrangement 111. To achieve this decoupling, the release bearing 40 is adjusted by an idle path 120 relative to a position corresponding to a fully engaged state of the friction clutch in direction of the transmission 108, so that the bearing shell 50 which is rotatable relative to the actuation piston 26 is arranged at a distance from the associated portions, possibly tabs, of the engagement spring arrangement 111 and, consequently, there is no rotational driving or force transmission connection between the release bearing 40 and the engagement spring arrangement 111 and accordingly the clutch 110.

The adjustment of the actuation device 10 in the non-actuation state may simply be carried out by releasing the compressed air venting connection between the cylinder interior 29 and the pressure compensation opening 66 by the action of the biasing tension spring arrangement 38. The requirement for the basing tension spring arrangement 38 is obviated when the pressure medium force cylinder arrangement 28 includes a double-action pressure medium force cylinder. In that embodiment, the adjustment into the non-actuation state occurs in response to corresponding pressure medium control of the pneumatic force cylinder.

The position which is occupied in the non-actuation state by the release bearing 40 or by the release piston 26 and which may be referred to as the waiting position may be defined by a mechanical stop at which the release piston 26 stops, for example. The waiting position may, for example, be the position of the release piston 26 in which it is moved into the cylinder housing 31 to the maximum degree. In this case, the distance between the release bearing 40 and the engagement spring arrangement in the non-actuation state changes depending on the friction facing wear of the friction clutch insofar as no steps have been taken to compensate for wear. The idle path defined by the maximum moved in position of the release piston into the cylinder housing causes relatively long actuation times, the actuation time being the time required for adjusting the actuation device into an actuation state or boundary state, represented in FIG. 4, of beginning clutch release (corresponding to a fully engaged clutch) and for the piston 26 to move farther outward for clutch actuation. The boundary position which must generally be taken into account for a defined clutch actuation and which is generally required may be determined in the course of every clutch actuation from the measurement signals of the measuring arrangement 16 because the adjustment speed of the release piston 26 changes in a defined manner when the bearing ring 50 stops at the engagement spring arrangement 111.

The actuation device 10 may also be adjusted into the non-actuation state by adjusting the release piston 26 or release bearing 40 toward the transmission 108 by a determined distance, i.e., the idle distance, relative to the boundary position in a defined manner and hold it there. This adjustment may be effected by a single-action pneumatic force cylinder arrangement via the biasing tension spring arrangement 38, wherein the pneumatic pressure and the spring forces are held in equilibrium while dispensing with a mechanical stop in the waiting position of the release piston 26 corresponding to the non-actuation state. In general, knowledge of the boundary position is likewise required for a defined position. This can be determined in a corresponding manner from a change in the adjusting speed when the bearing shell 50 abuts at the engagement spring arrangement 111 and/or from the position of the release bearing 50 or release piston 26 which may be determined during engagement, corresponding to the fully engaged state of the friction clutch or corresponding to the relaxed state of the engagement spring arrangement 111. In the latter case, only the position of the release bearing 40 or of the release piston 26 needs to be determined by the measuring arrangement 18 which adjusts the engagement spring arrangement 111 by acting on the release piston 26 via the release bearing 40 (possibly against pneumatic pressure forces which overcompensate for the biasing tension spring arrangement and act on the release piston 26 in the direction of abutment with the release bearing 40 at the engagement spring arrangement).

Figure 4:
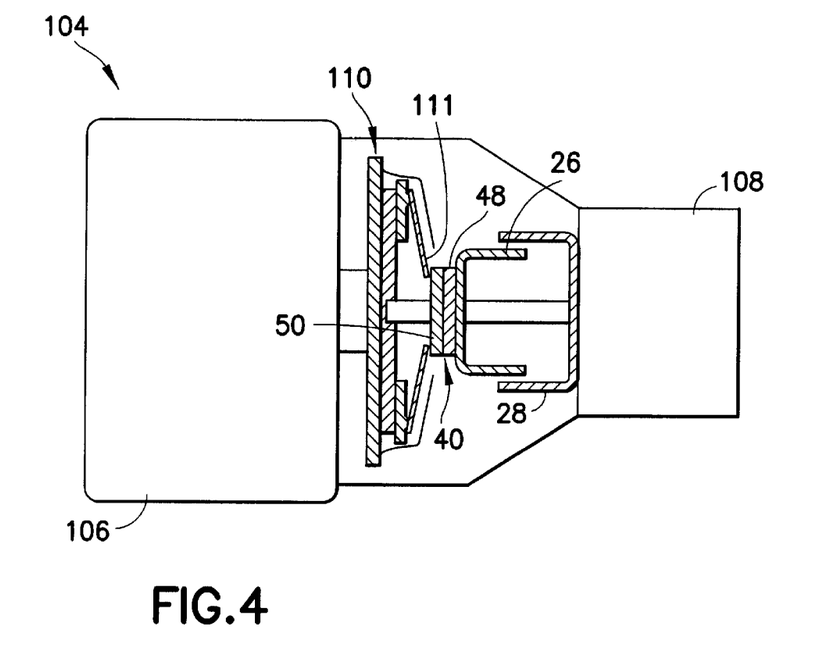
FIG. 4 is a schematic sectional view of the drivetrain of FIG. 2 with an actuation device adjusted in an actuation-ready state or in a boundary state of beginning clutch actuation belonging to an actuation state, wherein a release bearing of the actuation device occupies a ready position or boundary position essentially corresponding to the completely engaged state of the friction clutch in the actuation-ready state or in the boundary state.

To realize short actuation times, the actuation device may be adjustable to an actuation-ready state from which the clutch may be actuated with a minimum time delay or without any delay. For this purpose, the release bearing may be adjusted to a ready position which preferably corresponds to the above-mentioned boundary position of beginning clutch actuation. In the ready position, the rotational driving connection between the bearing shell 50 of the release bearing 40 and engagement spring arrangement 111 is already produced in that the release bearing is pretensioned slightly against the engagement spring arrangement by a corresponding application of pressure medium to the pressure medium force cylinder. In the present context, FIG. 4 shows a drivetrain with actuation arrangement adjusted to the actuation-ready state corresponding to the boundary state. As mentioned above, the release bearing may be positioned so that it is proximate the release force receiving arrangement in the fully engaged state of the friction clutch in the actuation-ready state, wherein the release bearing arrangement may be coupled with the release force receiving arrangement with a slight adjustment when it is in the actuation-ready state.

The control/regulation unit 86 adjusts of the actuation device 10 between the non-actuation state, actuation-ready state and the actuation state characterized by the transmission of release forces via the release bearing to the engagement spring arrangement as required. The control/regulating unit 86 responds to both instantaneous requirements and prognoses with respect to future requirements. Based on information about the driving speed of the vehicle, the control/regulating unit 86 determines transmission states (switching group signal of the transmission), other driving states and vehicle states, including an expectation value via sensor signals supplied to a Controller Area Network (CAN) bus of the control/regulating unit 86, which expectation value represents the frequency and/or probability of clutch actuations in a preview time interval and adjusts the actuation device depending on this expectation value between the non-actuation state and the actuation-ready state. For example, if the drive train includes a split-range transmission arrangement in the lower gears in which the shifting processes usually succeed one another quickly, the actuation device is held in the actuation-ready state so that the required clutch actuations may be carried out proceeding from this actuation-ready state without significant time delay. The release bearing preferably runs along steadily with the clutch in the actuation-ready state so that it does not need to be repeatedly accelerated to the speed of the clutch during the quickly succeeding clutch actuations. This reduces the loading on the bearing which results from the acceleration process and consequently significantly reduces the noise which develops as a result.

The present invention was explained above with reference to embodiment examples having a single-action pneumatic ring cylinder. However, the present invention is not limited to such constructions. A double-acting pneumatic cylinder 28' as shown in FIG. 2 may also be used. That is, a double-acting pressure medium force cylinder arrangement may also be provided in place of a single-action pressure medium force cylinder arrangement. The use of a double-acting pneumatic cylinder obviates the need for the biasing tension spring arrangement 38 because the release piston may be adjusted to the positions required for the realization of the different states and held therein by corresponding control of the pressure medium force cylinder arrangement. For example, at the conclusion of the engagement process when the engagement spring arrangement 111 (i.e., diaphragm spring) relaxes, the instantaneous position of the actuation piston may be detected by the measuring arrangement 18 (path sensor). Pressure medium may then be fed to the pressure medium force cylinder arrangement by corresponding control of a valve arrangement such that the actuation piston and therefore the release bearing are displaced by the idle path (play) into the waiting position (non-actuation state). The actuation piston may be held in this position by making use of friction forces and/or by tensioning the pressure medium piston on both sides by pressure medium. In a corresponding manner, the actuation position with the release bearing can be adjusted to the actuation-ready position (actuation-ready state) and held in this position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An actuation device for a friction clutch having a release force receiving arrangement and being arranged in a drivetrain of a motor vehicle between a drive unit and a transmission arrangement, said actuation device comprising:
   a pressure medium force cylinder arrangement having a release member with a release bearing arrangement connectable to the friction clutch for actuating the friction clutch;
   a measuring arrangement arrangeable for detecting an actual release state corresponding to a position of the release member;
   a control/regulating valve arrangement connected to a pressure medium source, a pressure medium opening, and said pressure medium force cylinder arrangement for actuating said pressure medium force cylinder arrangement in response to said actual release state of said release member and a desired release state, said actuation device being adjustable between an actuation state and a non-actuation state, wherein said actuation device is arrangeable such that said release member is coupled with the release force receiving arrangement of the friction clutch in the actuation state of said actuation device and is decoupled from the release force receiving arrangement in the non-actuation state of said actuation device; and
   a control/regulating unit operatively arranged for adjusting said actuation device between the non-actuation state and the actuation state,
   wherein said control/regulating unit actuates said pressure medium force cylinder arrangement in response to the actual release state and the desired release state of said release member via said control/regulating valve arrangement,
   wherein said control/regulating unit actuates said pressure medium force cylinder arrangement via said control/regulating valve arrangement for selectively adjusting said actuation device from the non-actuation state into the actuation-ready state, from the non-actuation state into a boundary state belonging to the actuation state of beginning clutch actuation, and from the non-actuation state through the boundary state into the actuation state, said release bearing arrangement momentarily occupying said boundary position which corresponds to the fully engaged state of the friction clutch, and
   wherein said control/regulating unit determines said boundary position in response to measurements taken by said measuring arrangement and further comprises a memory for storing said determined boundary position.

2. The actuation device of claim 1, wherein said release member changes an adjusting speed as said release member moves through the boundary position, said control/regulating unit being arranged for determining the boundary position from said change in the adjusting speed of said release member which occurs when moving through the boundary position.

3. The actuation device of claim 2, wherein said control/regulating unit is arranged for identifying the boundary position as a position of said release member in which the adjusting movement of said release member is braked by the release force receiving arrangement during a disengagement of the friction clutch via adjustment of said actuation device from the non-actuation state to the actuation state.

4. The actuation device of claim 1, wherein said control/regulating unit identifies the boundary position as a position of one of said release bearing arrangement and said release member corresponding to a relaxed release force receiving arrangement of the friction clutch during a complete engagement.

5. An actuation device for a friction clutch having a release force receiving arrangement and being arranged in a drivetrain of a motor vehicle between a drive unit and a transmission arrangement, said actuation device comprising:
   a pressure medium force cylinder arrangement having a release member with a release bearing arrangement connectable to the friction clutch for actuating the friction clutch;
   a measuring arrangement arrangeable for detecting an actual release state corresponding to a position of the release member;
   a control/regulating valve arrangement connected to a pressure medium source, a pressure medium opening, and said pressure medium force cylinder arrangement for actuating said pressure medium force cylinder arrangement in response to said actual release state of said release member and a desired release state, said actuation device being adjustable between an actuation state and a non-actuation state, wherein said actuation device is arrangeable such that said release member is coupled with the release force receiving arrangement of the friction clutch in the actuation state of said actuation device and is decoupled from the release force receiving arrangement in the non-actuation state of said actuation device,
   wherein said actuation device is adjustable to an actuation-ready state, said actuation device being arrangeable such that said release bearing arrangement is one of coupled with the release force receiving arrangement and proximate the release force receiving arrangement in the actuation-ready state; and
   a control/regulating unit operatively arranged for adjusting said actuation device between the non-actuation state, the actuation-ready state, and the actuation state, wherein said control/regulating unit actuates said pressure medium force cylinder arrangement in response to the actual release state and the desired release state of said release member via said control/regulating valve arrangement for actuating the friction clutch, wherein said control/regulating unit actuates said pressure medium force cylinder arrangement via said control/regulating valve arrangement for selectively adjusting said actuation device from the non-actuation state through the actuation-ready state to the actuation state, from the non-actuation state into a boundary state belonging to the actuation state at the beginning of clutch actuation, and from the non-actuation state through the boundary state into the actuation state, wherein said release bearing arrangement occupies a ready position which corresponds to the fully engaged state of the friction clutch in the actuation-ready state, and wherein said control/regulating unit determines the ready position in response to measurements taken by said measuring arrangement and further comprises a memory for storing said determined ready position.

6. The actuation device of claim 5, wherein release member changes an adjusting speed as said release member moves through the boundary position, said control/regulating unit being arranged for determining the ready position from said change in the adjusting speed of said release member which occurs when moving through the ready position.

7. The actuation device of claim 6, wherein said control/regulating unit is arranged for identifying the ready position as a position of said release member in which the adjusting movement of said release member is braked by said release force receiving arrangement during a disengagement of the friction clutch via adjustment of said actuation device from the non-actuation state to the actuation state.

8. The actuation device of claim 5, wherein said control/regulating unit identifies the ready position as a position of one of said release bearing arrangement and said release member corresponding to a relaxed release force receiving arrangement of the friction clutch during a complete engagement.

9. An actuation device for a friction clutch having a release force receiving arrangement and being arranged in a drivetrain of a motor vehicle between a drive unit and a transmission arrangement, said actuation device comprising:

a pressure medium force cylinder arrangement having a release member with a release bearing arrangement connectable to the friction clutch for actuating the friction clutch;

a measuring arrangement arrangeable for detecting an actual release state corresponding to a position of the release member;

a control/regulating valve arrangement connected to a pressure medium source, a pressure medium opening, and said pressure medium force cylinder arrangement for actuating said pressure medium force cylinder arrangement in response to said actual release state of said release member and a desired release state, said actuation device being adjustable between an actuation state and a non-actuation state, wherein said actuation device is arrangeable such that said release member is coupled with the release force receiving arrangement of the friction clutch in the actuation state of said actuation device and is decoupled from the release force receiving arrangement in the non-actuation state of said actuation device, wherein said actuation device is adjustable to an actuation-ready state, said actuation device being arrangeable such that said release bearing arrangement is one of coupled with the release force receiving arrangement and proximate the release force receiving arrangement in the actuation-ready state; and a control/regulating unit operatively arranged for adjusting said actuation device between the non-actuation state, the actuation-ready state, and the actuation state, wherein said control/regulating unit actuates said pressure medium force cylinder arrangement in response to the actual release state and the desired release state of said release member via said control/regulating valve arrangement for actuating the friction clutch, and wherein said control/regulating unit comprises a prognostic unit which generates a forecast of the frequency and probability of clutch actuations for a preview time interval based on at least one of operating and driving states of the vehicle, operating and actuation states of the transmission, and operating states of the drive unit, and actions of a driver, wherein said control/regulating unit is operatively arranged for adjusting said actuation device between the non-actuation state and the actuation-ready state in response to said forecast generated by said prognostic unit.

* * * * *